(12) United States Patent
Lin et al.

(10) Patent No.: US 10,466,814 B2
(45) Date of Patent: Nov. 5, 2019

(54) ELECTRONIC SYSTEM, INDICATING DEVICE AND OPERATING METHOD THEREOF

(71) Applicant: ASUSTeK COMPUTER INC., Taipei (TW)

(72) Inventors: Hung-Yi Lin, Taipei (TW); Yi-Lun Lai, Taipei (TW); Hao-Ping Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 15/786,677

(22) Filed: Oct. 18, 2017

(65) Prior Publication Data

US 2018/0113522 A1  Apr. 26, 2018

(30) Foreign Application Priority Data

Oct. 25, 2016 (TW) .............................. 105134442 A

(51) Int. Cl.
| | |
|---|---|
| *G06F 3/0354* | (2013.01) |
| *G06K 9/00* | (2006.01) |
| *G06K 9/22* | (2006.01) |
| *G06F 3/01* | (2006.01) |
| *G06F 3/038* | (2013.01) |
| *G06F 3/03* | (2006.01) |

(52) U.S. Cl.
CPC .......... *G06F 3/03545* (2013.01); *G06F 3/017* (2013.01); *G06F 3/0383* (2013.01); *G06K 9/00154* (2013.01); *G06K 9/00402* (2013.01); *G06K 9/222* (2013.01); *G06K 9/224* (2013.01); *G06F 3/03* (2013.01)

(58) Field of Classification Search
CPC ... G06K 9/22; G06K 9/00152; G06K 9/00402
USPC ................................ 345/156, 173–174, 179
See application file for complete search history.

(56) References Cited

U.S. PATENT DOCUMENTS

| | | | |
|---|---|---|---|
| 6,195,446 B1 | 2/2001 | Skoog | |
| 2014/0022218 A1* | 1/2014 | Parekh | .................... G06F 3/038 |
| | | | 345/179 |

(Continued)

FOREIGN PATENT DOCUMENTS

| | | |
|---|---|---|
| CN | 103455739 A | 12/2013 |
| TW | 201602836 A | 1/2016 |

*Primary Examiner* — Calvin C Ma
(74) *Attorney, Agent, or Firm* — McClure, Qualey & Rodack, LLP

(57) ABSTRACT

An electronic system comprising an electronic device and an indicating device is provided. The indicating device includes a wireless communication circuit configured to be communicated with the electronic device, a switch circuit, a motion sensor for detecting a movement of the indicating device, and a control unit coupled to the wireless communication circuit, the motion sensor and the switch circuit. In a period that the switch circuit is triggered, the motion sensor detects a plurality of three-dimensional rotation matrices of the indicating device in the space. A movement trace of the indicating device is computed by the electronic device according to the three-dimensional rotation matrices, and a corresponding operating function is enabled according to the movement trace. An operating method and an indicating device is further provided.

10 Claims, 9 Drawing Sheets

(56) References Cited

U.S. PATENT DOCUMENTS

2014/0184496 A1* 7/2014 Gribetz ............... G02B 27/017
                                                345/156
2016/0104080 A1* 4/2016 Greenberg ............ G06Q 10/02
                                                705/5

* cited by examiner

ELECTRONIC SYSTEM, INDICATING DEVICE AND OPERATING METHOD THEREOF

CROSS-REFERENCE TO RELATED APPLICATION

This application claims the priority benefit of Taiwan application serial No. 105134442, filed on Oct. 25, 2016. The entirety of the above-mentioned patent application is hereby incorporated by references herein and made a part of specification.

BACKGROUND OF THE INVENTION

Field of the Invention

The disclosure relates to an electronic system and a method for an indicating device and, more specifically, to an electronic system and method for recognizing a movement path of an indicating device.

Description of the Related Art

Electronic devices usually have different input interfaces, such as a keyboard, a mouse, a microphone, a touch screen or a hand held position-indicating device. For example, a touch control device is usually equipped with a hand held position-indicating device as the input interface. Various functions of the electronic device can be triggered by simply moving the hand held position-indicating device on the surface of the touch screen.

BRIEF SUMMARY OF THE INVENTION

According to a first aspect of the disclosure, an electronic system is provided. The electronic system comprises an electronic device and an indicating device. The indicating device includes: a wireless communication circuit configured to be communicated with the electronic device; a switch circuit; a motion sensor configured to detect a movement of the indicating device; and a control unit coupled to the wireless communication circuit, the motion sensor and the switch circuit. While the switch circuit is triggered, the motion sensor detects a plurality of three-dimensional rotation matrices of the indicating device in the space. The control unit transmits the three-dimensional rotation matrices to the electronic device via the wireless communication circuit. A movement trace of the indicating device is computed by the electronic device according to the three-dimensional rotation matrices. A corresponding operating function is operated according to the movement trace.

According to a second aspect of the disclosure, an operating method, adapted to an indicating device including a switch circuit and a motion sensor, is provided. The operating method comprises: detecting whether the switch circuit is triggered; detecting a plurality of three-dimensional rotation matrices of the indicating device in the space by the motion sensor while the switch circuit is triggered; and transmitting the three-dimensional rotation matrices to an electronic device and computing a movement trace of the indicating device.

According to a third aspect of the disclosure, an indicating device is provided. The indicating device comprises: a wireless communication circuit configured to be communicated to an electronic device; a switch circuit; a motion sensor for detecting a movement of the indicating device; and a control unit coupled to the wireless communication circuit, the motion sensor and the switch circuit. In a period that the switch circuit is triggered, the motion sensor detects a plurality of three-dimensional rotation matrices of the indicating device in the space. The control unit provides the three-dimensional rotation matrices to the electronic device via the wireless communication circuit.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

To better understand the disclosure, details of embodiments are described hereinafter accompanying with the figures, which are not used for limiting the scope of the present disclosure. Structural operations described in embodiments of the present disclosure do not limit the operation sequence/steps. Any recombined configuration of the structure that performs the same functionality in embodiment is covered by the disclosure. In the present disclosure, the term "connect/couple" refers to "electrically connected/coupled (to)" or the cooperation/interacting relationship between two or more than two components.

Figure 1:
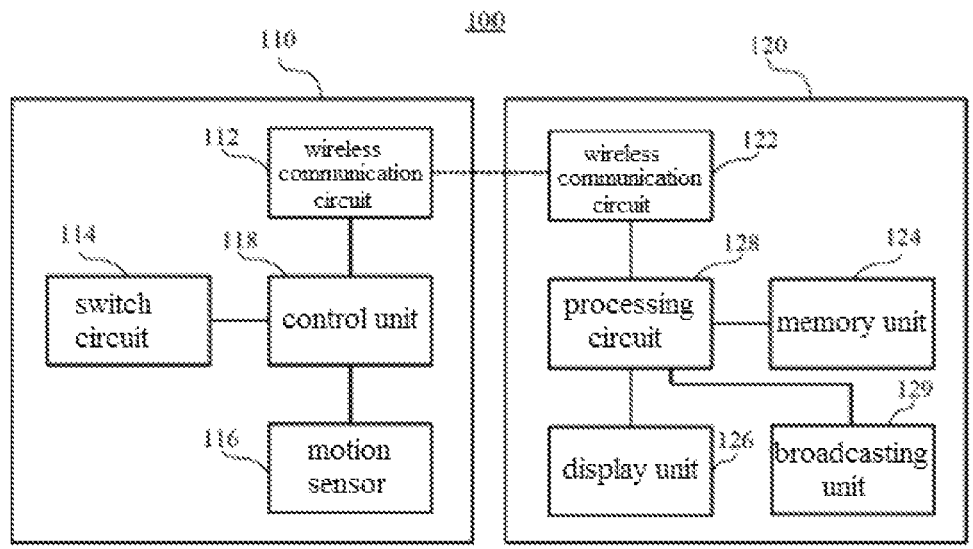
FIG. 1 is a schematic diagram showing an electronic system in an embodiment.

FIG. 1 is a schematic diagram showing an electronic system 100 in an embodiment. An electronic system 100 includes an indicating device 110 and an electronic device 120. In an embodiment, the electronic device 120 is a smartphone, a tablet computer, a notebook, a desktop computer, a video projector, an advertisement projector or the like. In an embodiment, the indicating device 110 is a stylus, a touch laser pointer or the like.

In the electronic system 100, when the indicating device 110 is operated in a three-dimensional space, the indicating device 110 generates and transmits movement information to the electronic device 120. A corresponding operating function is operated by the electronic device 120 according to a movement trace of the indicating device 110. As shown in FIG. 1, the indicating device 110 includes a wireless communication circuit 112, a switch circuit 114, a motion sensor 116 and a control unit 118. The wireless communication circuit 112 is configured to be communicated to the electronic device 120 to transmit data therebetween. In an embodiment, the wireless communication circuit 112 is a Wi-Fi communication circuit, a Zigbee communication circuit, a Bluetooth communication circuit, an infrared transceiver circuit, which is not limited herein.

Figure 2:
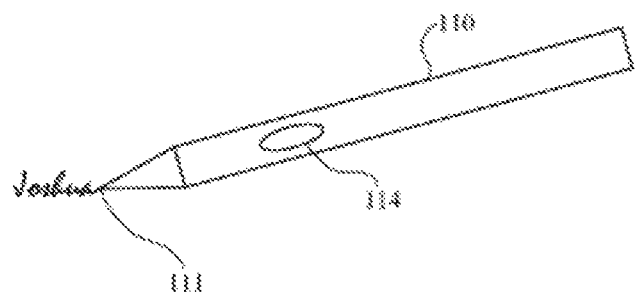
FIG. 2 is a schematic diagram showing an indicating device in an embodiment.

In an embodiment, the switch circuit 114 is a button-type switch. Please refer to FIG. 2. FIG. 2 is a schematic diagram showing an indicating device 110 in an embodiment. As shown in FIG. 2, in an embodiment, the switch circuit 114 is a button-type switch disposed on the surface of the indicating device 110. In embodiments, the switch circuit 114 is a light sensing switch, a pressure sensing switch, a contact sensing switch or the like.

The motion sensor 116 detects the movement of the indicating device 110 in the three-dimensional space. In an embodiment, the motion sensor 116 includes a six-axis acceleration sensor. When the indicating device 110 moves in the three-dimensional space, the motion sensor 116 detects three-dimensional rotation matrices of the movement. In an embodiment, the motion sensor 116 includes a g-sensor or a gyroscope, which is not limited herein.

As shown in FIG. 1, the control unit 118 is coupled to the wireless communication circuit 112, the switch circuit 114 and the motion sensor 116. In an embodiment, the control unit 118 is a processor, a system-on-a-chip (SoC), a micro-electromechanical system (MEMS) or the like that can be implemented cooperating with corresponding software or firmware.

Figure 3:
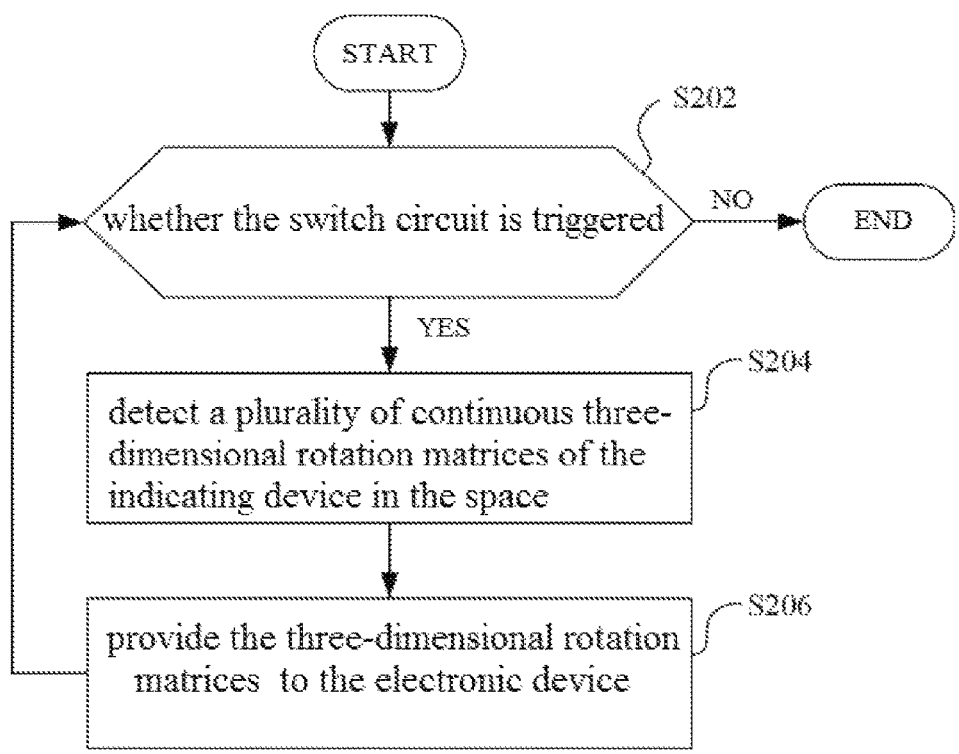
FIG. 3 is a flow chart of an operating method from a perspective of an indicating device in an embodiment.

Please refer to FIG. 3. FIG. 3 is a flow chart of an operating method from a perspective of an indicating device in an embodiment. As shown in FIG. 3, in step S202, the control unit 118 of the indicating device 110 determines whether the indicating device is triggered by the switch circuit 114.

Figure 4:
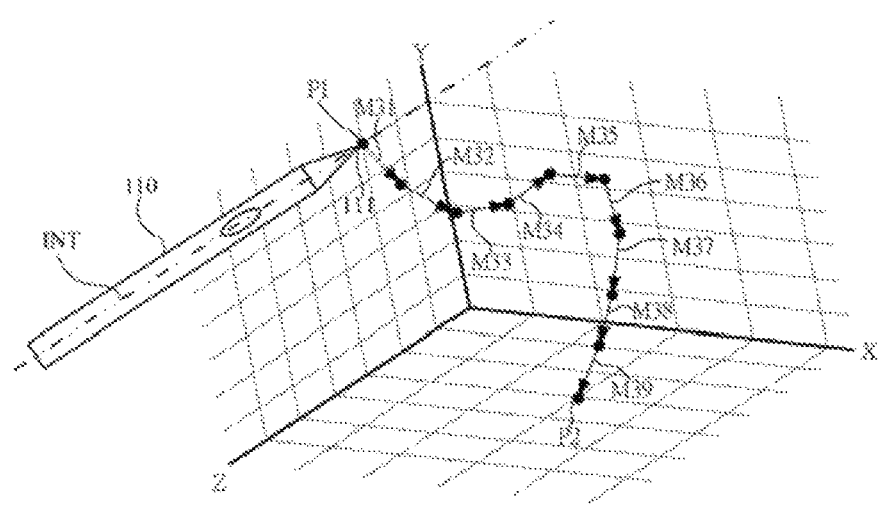
FIG. 4 is a schematic diagram showing a plurality of continuous three-dimensional rotation matrices of an indicating device in the space detected by a motion sensor in an embodiment.

When it is determined that the switch circuit 114 is triggered, step S204 is performed. In step S204, the motion sensor 116 detects the movement of the indicating device 110 in the three-dimensional space and generates a plurality of three-dimensional rotation matrices. In an embodiment, the indicating device 110 projects the time-dependent three-dimensional rotation matrices generated by the motion sensor 116 onto a plane in the space by a rotational projection to obtain a plurality of two-dimensional special coordinates. Please refer to FIG. 4. FIG. 4 is a schematic diagram showing a plurality of continuous three-dimensional rotation matrices M31 to M39 of an indicating device 110 in the space detected by a motion sensor 116 in an embodiment.

In FIG. 4, in an embodiment, when the switch circuit 114 is triggered for 0.9 seconds, the motion sensor 116 measures a current direction and magnitude of the acceleration of the indicating device 110 every 0.1 seconds. The tip of the indicating device 110 is at a point P1 when the switch circuit 114 is triggered, and then the tip of the indicating device 110 moves to the point P2 the switch circuit 114 is stopped. During the movement of the indicating device 110, the three-dimensional rotation matrices M31, M32, M33 to M39 are measured in turn by the motion sensor 116. The directions and magnitudes of the three-dimensional rotation matrices M31 to M39 are various, which depends on the direction/angle and the velocity of the indicating device 110 in moving. Each of the three-dimensional rotation matrices M31 to M39 includes angle variation values ($\Delta\theta$) detected by the motion sensor 116 on multiple axial directions in a time unit, respectively. In an embodiment, with a six-axis sensor, acceleration variations on three different axial directions and angular velocity variations on three different axial directions are obtained. In an embodiment, the six-axis sensor includes a gyroscope and an accelerometer.

The gyroscope is used for measuring angular velocities. The feature of the gyroscope is accurate and sensitive when used for a short period. However, after the gyroscope is used for a long period, the gyroscope becomes unreliable in computing an angle due to error accumulations. The angular velocity is an angular displacement that an object rotates with respect to time. If the object rotates only about X axis, the outputs at the Y-axis and the Z-axis are 0, an X-axis output is a rotational angular velocity. The accelerometer is used for measuring accelerations (which includes a motion acceleration and a gravity acceleration). That is, when the sensor is in free fall, the motion acceleration and the gravity acceleration counteract with each other. Since the accelerometer is capable of measuring a gravity acceleration, the accelerometer usually functions as a tiltmeter in a gravitational environment. An angle is computed via the projections of the gravity on the three axes. Since the gravity acceleration does not vary rapidly with time, the accelerometer is reliable in computing an angle after a long time of use. Therefore, the accelerometer is usually used with the gyroscope for calibrating the gyroscope to eliminate the error accumulations. From the rotation matrices detected by the motion sensor 116, the acceleration values on the three axial directions and the angular velocity values on the three axial directions are obtained. From the continuous acceleration values and angular velocity values, a relative movement of the indicating device 110 in a preceding and succeeding period is deduced. From the continuous relative movements, relative changes of the coordinates of the indicating device 110 between various time points are obtained.

In step S206, the control unit 118 transmits the detected three-dimensional rotation matrices M31 to M39 in sequence to the electronic device 120 via the wireless communication circuit 112. In an embodiment, to shorten an operation responsive time, the control unit 118 transmits each of the three-dimensional rotation matrices M31 to M39 immediately once detected to the electronic device 120. In an embodiment, to reduce the power consumption, the control unit 118 transmits the accumulated three-dimensional rotation matrices (for example, the three-dimensional rotation matrices M31 to M33, M34 to M36 and M37 to M39 are provided in batches) to the electronic device 120. In an embodiment, to further reduce the power consumption, the control unit 118 transmits all of the three-dimensional rotation matrices M31 to M39 in sequence to the electronic device 120 at the time when the switch circuit 114 is triggered.

As shown in FIG. 1, the electronic device 120 includes a wireless communication circuit 122 and a processing circuit 128. The processing circuit 128 is coupled to the wireless communication circuit 122. In an embodiment, the wireless communication circuit 122 includes a Wi-Fi communication circuit, a Zigbee communication circuit, a Blue-tooth communication circuit, an infrared transceiver circuit and/or other wireless communication circuits. In an embodiment, the processing circuit 128 is a processor, a SoC (system-on-a-chip), a micro-electromechanical system (MEMS) or other control chips/circuits that are implemented cooperating with corresponding software or firmware.

The wireless communication circuit 122 receives the three-dimensional rotation matrices M31 to M39 from the indicating device 110. A movement trace of the indicating device 110 is computed by the processing circuit 128 according to the three-dimensional rotation matrices M31 to M39 of the indicating device 110. Then, a corresponding operating function is operated by the electronic device 120 via the processing circuit 128 according to the movement trace. In an embodiment, the operating function is a device locking function, a device unlocking function, an indicating function, a volume adjusting function and/or a page switching function.

Figure 5:
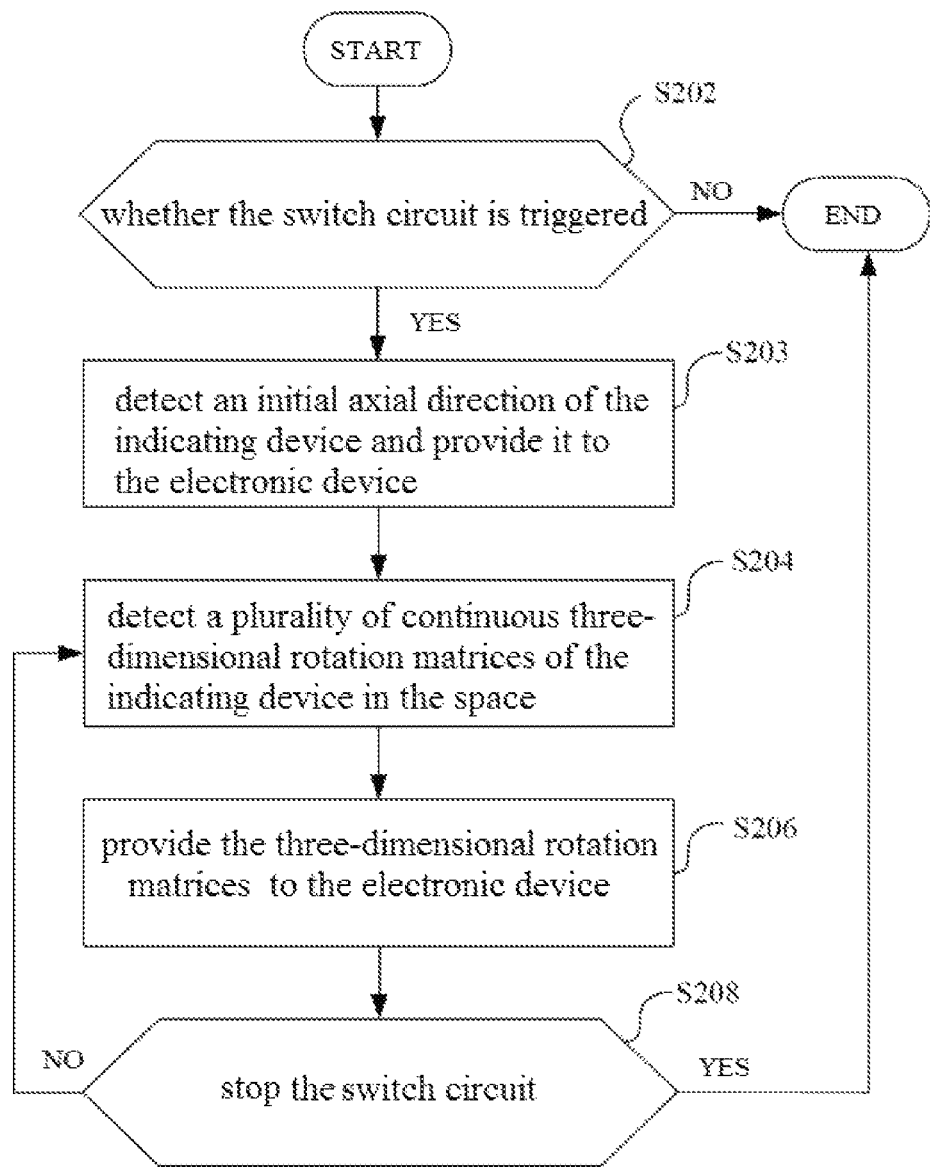
FIG. 5 is a flow chart of an operating method from a perspective of an indicating device in an embodiment.
Figure 6:
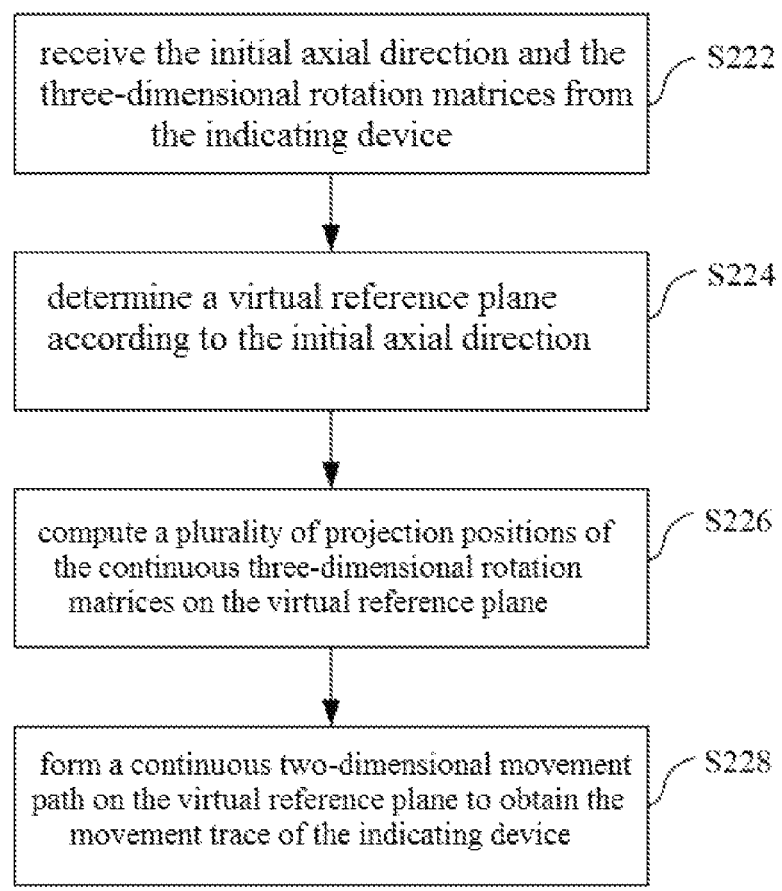
FIG. 6 is a flow chart of the operating method in FIG. 5 from a perspective of an electronic device in an embodiment.

In an embodiment in FIG. 3, the movement trace of the indicating device 110 is directly computed by the processing circuit 128 of the electronic device 120 according to the three-dimensional rotation matrices M31 to M39 of the indicating device 110, which is not limited herein. Please refer to FIG. 5 and FIG. 6. FIG. 5 is a flow chart of an operating method 201 from a perspective of an indicating device 110 in an embodiment. FIG. 6 is a flow chart of the operating method 201 in FIG. 5 from a perspective of an electronic device 120 in an embodiment As shown in FIG. 5, in step S202, whether the switch circuit 114 is triggered is detected. When the switch circuit 114 is triggered, proceed to step S203. In step S203, the control unit 118 detects an initial axial direction of the indicating device 110 via the motion sensor 116. The initial axial direction is transmits to the electronic device 120 via the wireless communication circuit 112. As shown in FIG. 4, when the switch circuit 114 is triggered, the initial axial direction INT of the indicating device 110 is directed inwardly to the point P1 from the bottom left to the upper right. In steps S204 and S206, while the switch circuit 114 is triggered, the motion sensor 116 detects a plurality of continuous three-dimensional rotation matrices of the indicating device 110 in the space. As shown in FIG. 4, the control unit 118 transmits the three-dimensional rotation matrices M31 to M39 to the electronic device 120 via the wireless communication circuit 112. In step S208, when it is detected that the switch circuit 114 is stopped, the method ends. Details for the steps S204 and S206 are described in the previous embodiments of FIG. 3 and FIG. 4, which are not described repeatedly herein.

As shown in FIG. 4 and FIG. 6, in step S222, the processing circuit 128 of the electronic device 120 receives the initial axial direction INT and the three-dimensional rotation matrices M31 to M39 from the indicating device 110 via the wireless communication circuit 122. In step S224, the processing circuit 128 determines a virtual reference plane according to the initial axial direction INT. In the embodiment, the initial axial direction INT is directed to the normal vector of the virtual reference plane. The virtual reference plane determined according to the initial axial direction INT of the indicating device 110 is the X-Y plane in FIG. 4. Therefore, three spatial axes (X axis, Y axis and Z axis) in FIG. 4 are not constant spatial coordinates, but determined according to the initial axial direction INT of the indicating device 110 when the switch circuit 114 is triggered/pressed. In an embodiment, the initial axial direction INT of the indicating device 110 (which is hold by the user) changes, the X axis, the Y axis and the Z axis also change. In the embodiment, the X axis, the Y axis, the Z axis and the XY plane form a reference coordinate system for rotational projection and computation of the movement trace of the indicating device 110.

Figure 7:
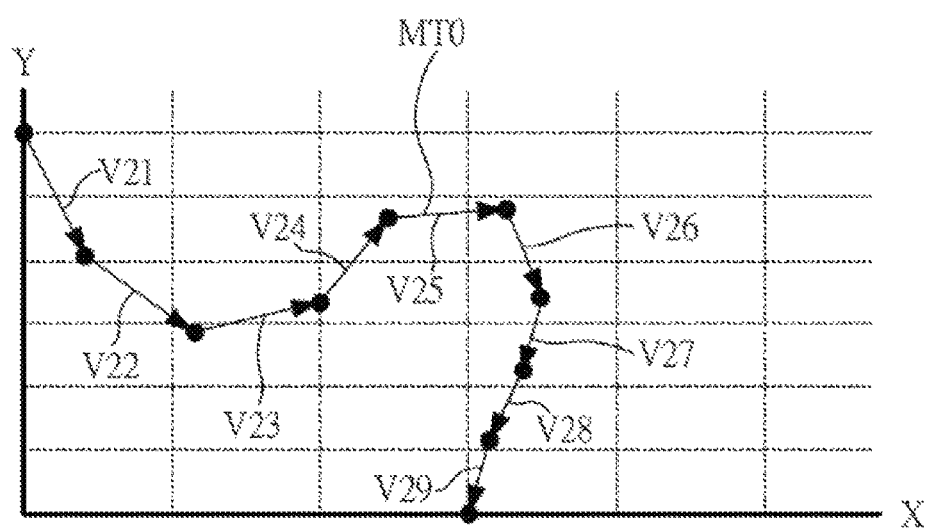
FIG. 7 is a schematic diagram showing projection positions of the three-dimensional rotation matrices in FIG. 4 on a virtual reference plane.

In step S226, the processing circuit 128 computes a plurality of projection positions of the continuous three-dimensional rotation matrices M31 to M39 on the virtual reference plane (that is, the XY plane). Please refer to FIG. 7. FIG. 7 is a schematic diagram showing projection positions of the three-dimensional rotation matrices M31 to M39 in FIG. 4 on a virtual reference plane. As shown in FIG. 7, the three-dimensional rotation matrices M31 to M39 in FIG. 4 are projected onto the XY plane to obtain two-dimensional movement vectors V21 to V29. The two-dimensional movement vectors V21 to V29 on the virtual reference plane form a continuous two-dimensional movement path MT0 (connected by the two-dimensional movement vectors V21 to V29 in sequence). In the embodiment, the electronic device 120 takes the continuous two-dimensional movement path MT0 on the virtual reference plane as the movement trace of the indicating device 110.

In the embodiment, the continuous two-dimensional movement path MT0 on the two-dimensional plane is taken as the movement trace. As a result, the comparison/determination result is easy to determine the enable of the subsequent operating function, and the efficiency of the computing process is improved while the time is saved.

Figures 8A, 8B:
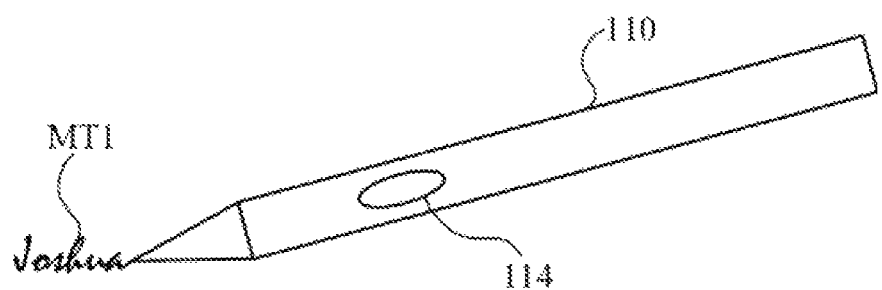
FIG. 8A is a schematic diagram showing a signature trace stored in a memory unit in an embodiment.
FIG. 8B is a schematic diagram showing a movement path of an indicating device detected by an electronic system in an embodiment.

In an embodiment, the electronic device 120 (such as mobile phone, smart phone, tablet computer, notebook and the like) has a device verification function. In an embodiment, the operating function is a device locking function or a device unlocking function. In an embodiment, when the electronic device 120 is wakened by the user, an identity verification is needed to unlock the electronic device 120 in a locking mode. In an embodiment, when the user leaves the electronic device 120 temporarily, the electronic device 120 enters the locking mode via an identity verification process. In the embodiment, the movement trace of the indicating device 110 is used as an identity verification to enable the device locking function or the device unlocking function. As shown in FIG. 1, the electronic device 120 further includes a memory unit 124. In the embodiment, the memory unit 124 stores a signature trace. Please refer to FIG. 8A and FIG. 8B. FIG. 8A is a schematic diagram showing a signature trace SIG stored in a memory unit 124 in an embodiment. FIG. 8B is a schematic diagram showing a movement path MT1 of an indicating device 110 detected by an electronic system 100 in an embodiment.

In an embodiment, the signature trace SIG stored in the memory unit 124 is the movement trace measured previously (as described in the previous embodiments of FIG. 3 or FIG. 5 and FIG. 6) of the indicating device 110, which is set to be stored into the memory unit 124 of the electronic device 120 by the user.

When the electronic device 120 is in a locking mode, in an embodiment, the user presses the switch circuit 114 of the indicating device 110. While the switch circuit 114 is pressed, the user holds the indicating device 110 to write a specific word(s) or symbol(s) (such as the signature of the user) in the three-dimensional space. With the electronic system 100 and operating method 200/201, the movement trace MT1 of the indicating device is obtained. In an embodiment, the movement trace MT1 is computed directly from the three-dimensional rotation matrices M31 to M39, as described in the embodiment of FIG. 3. In an embodiment, the movement trace MT1 is the continuous two-dimensional movement path projected onto the virtual reference plane, as described in FIG. 5 and FIG. 6. Then, the electronic device 120 compares the movement trace MT1 with the signature trace SIG stored in the memory unit 124. If the movement trace MT1 conforms to the signature trace SIG stored in the memory unit 124, the electronic device 120 is unlocked from the locking state. As shown in FIG. 8A and FIG. 8B, in the embodiment, if the movement trace MT1 does not conform to the signature trace SIG, the electronic device 120 keeps in the locking state.

In an embodiment, when the electronic device 120 is in a power-on state, the switch circuit 114 of the indicating device 110 is pressed. In the period of pressing the switch circuit 114, a specific word(s) or symbol(s) is written in the three-dimensional space via the indicating device 110. The movement trace MT1 of the indicating device is obtained. The electronic device 120 compares the movement trace MT1 with the signature trace SIG stored in the memory unit 124. When the movement trace MT1 conforms to the signature trace SIG stored in the memory unit 124, the electronic device 120 enters the locking mode from the power-on state. When the movement trace MT1 does not conform to the signature trace SIG, the electronic device 120 is kept in the power-on state.

With the electronic system 100 and the operating method 200/201, when the indicating device 110 is used for the signature verification, the user does not have to write on the touch panel of the electronic device 120 or a specific surface. The indicating device 110 can write directly in the space (or on any plane or curved plane) for the for signature verification. In such a way, the indicating device 110 is operated in various ways. Moreover, it is not easy for others to peek the password. In an embodiment, the movement trace MT1 of the indicating device 110 for the signature is also adapted to be applied for the identity verification in mobile payment.

Figure 9:
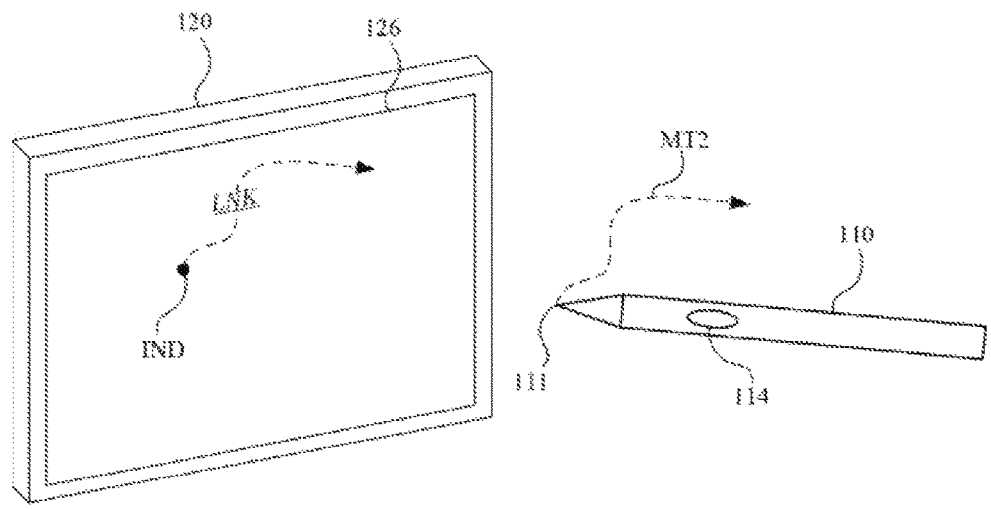
FIG. 9 is a schematic diagram showing an indicating device used for indicating in an embodiment.

As shown in FIG. 1, in an embodiment, the electronic device 120 further includes a display unit 126. In an embodiment, the display unit 126 is a display panel, a touch panel, a digital projecting module or the like. In the embodiment, words, pictures, images, briefs, webpages and information can be displayed on the display unit 126. In an embodiment, the indicating device 110 is used as an indicator which enables an indicating function at the electronic device 120 via the electronic system 100. Please refer to FIG. 9. FIG. 9 is a schematic diagram showing an indicating device 110 used for indicating in an embodiment.

Various words, pictures, images, briefs or webpage are displayed on the display unit 126. When the switch circuit 114 of the indicating device 110 is triggered, the electronic device 120 captures the position of the indicating device 110 and/or the initial axial direction of the indicating device 110 (the initial axial direction INT as described in FIG. 4), according to the relative positions of the tip 111 of indicating device 110 and the display unit 126. Then, an indicating lightspot INT is displayed on the display unit 126. In an embodiment, the electronic device 120 includes a camera, a depth camera or a video camera for the capture.

In an embodiment, when the switch circuit 114 is triggered, the electronic device 120 is preset to initially display the indicating lightspot INT at the center of the display unit 126.

A plurality of continuous three-dimensional rotation matrices of the indicating device 110 in the space is detected while the switch circuit 114 is continuously triggered, and then a movement trace MT2 of the indicating device 110 is obtained. As shown in FIG. 9, as the movement trace MT2 of the indicating device 110 changes, the position of the indicating lightspot INT displayed on the display unit 126 also changes accordingly. In such a way, the indicating device 110 in the electronic system 100 is used like a laser pointer. Moreover, the light path of the indicating device 110 would not be blocked by obstructers like the laser pointer when the indicating lightspot INT is displayed.

In an embodiment, the indicating lightspot INT of the indicating device 110 is used for an input operation of a mouse or a trackball. When the indicating lightspot INT of the indicating device 110 moves to a hyperlink LNK displayed on the display unit 126 and stops adjacent to the hyperlink LNK, the electronic device 120 displays a pop-up menu or an enlarged text or icon of the hyperlink LNK on the display unit 126. In an embodiment, when the movement trace MT2 of the indicating device 110 conforms to a preset pathway (such as, quickly circling, quickly ticking, or quickly releasing and clicking the switch circuit 114), a webpage corresponding to the hyperlink LNK is opened. In an embodiment, when the indicating lightspot INT does not stop adjacent to the hyperlink LNK, the pop-up menu is closed, or the enlarged text or icon of the hyperlink LNK is resized. In an embodiment, when the movement trace MT2 does not conform to the preset pathway, the webpage corresponding to the hyperlink LNK is not opened.

Figure 10:
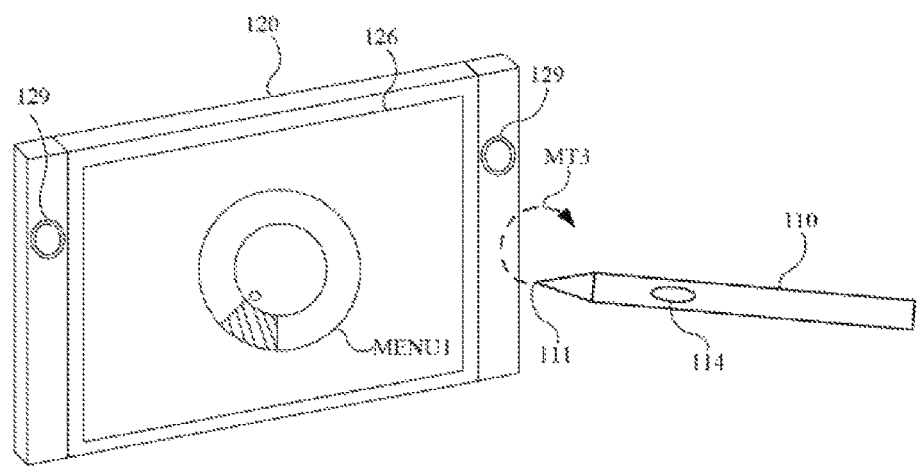
FIG. 10 is a schematic diagram showing an indicating device used for volume adjustment in an embodiment.

As shown in FIG. 1, in an embodiment, the electronic device 120 further includes the display unit 126 and a broadcasting unit 129. In the embodiment, the broadcasting unit 129 is a horn, a loudspeaker, an earphone or other hardware component for broadcasting. Please refer to FIG. 10. FIG. 10 is a schematic diagram showing an indicating device 110 used for volume adjustment.

In the embodiment, the indicating device 110 is used for the volume adjustment of the electronic device 120. The switch circuit 114 of the indicating device 110 is pressed to adjust the volume. As shown in FIG. 10, when the switch circuit 114 is triggered, a volume adjustment menu MENU1 is displayed on the display unit 126. Then, in a period that the switch circuit 114 is triggered, the continuous three-dimensional rotation matrices of the indicating device 110 in the space are detected. A movement trace MT3 of the indicating device 110 is obtained. Then, as shown in FIG. 10, the electronic device 120 adjusts the volume of the broadcasting unit 129 according to the movement trace MT3 of the indicating device 110. In an embodiment, when the movement trace MT3 rotates clockwise. The volume is increased, and when the movement trace MT3 rotates counterclockwise, the volume is reduced.

Figure 11:
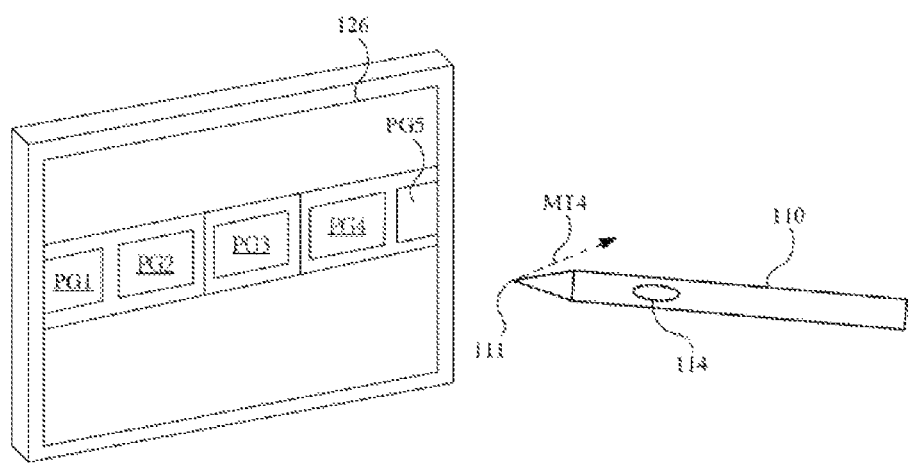
FIG. 11 is a schematic diagram showing an indicating device used for page switching in an embodiment.

Please refer to FIG. 11. FIG. 11 is a schematic diagram showing an indicating device 110 used for page switch. In the embodiment, the indicating device 110 is used as a wireless controller for page switching of the electronic device 120. A File (such as a slide including a plurality of pages at the beginning) or a web browser interface (such as a plurality of tab pages in running) is displayed on the display unit 126. To switch the page, the switch circuit 114 of the indicating device 110 is pressed. As shown in FIG. 11, when the switch circuit 114 is triggered, one of the multiple thumbnail pages (such as five thumbnail pages PG1~PG5 shown in FIG. 11) of the file or one of the multiple tab pages of the web browser interface is displayed on the display unit 126. Then, in a period that the switch circuit 114 is triggered, a plurality of continuous three-dimensional rotation matrices of the indicating device 110 in the space are detected. A movement trace MT4 of the indicating device 110 is obtained. The electronic device 120 scrolls the thumbnail pages (for example, the thumbnail page PG3 is scrolled to the thumbnail page PG4 or PG5) or switches the multiple tab pages according to the movement trace MT4.

In the embodiments, the electronic device is remotely controlled to enable corresponding operating functions via the movement traces of the indicating device. The operating function is enabled by a corresponding three-dimensional gesture (such as clicking, sliding, rotating and the like) in the space (or on any plane or curved plane). As a result, it does not need to write on the touch panel of the electronic device or a specific surface as conventional.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. An electronic system comprising:
    an electronic device; and
    an indicating device including:
    a wireless communication circuit configured to be communicated with the electronic device;
    a switch circuit;
    a motion sensor configured to detect a movement of the indicating device; and
    a control unit coupled to the wireless communication circuit, the motion sensor and the switch circuit, while the switch circuit is triggered, the motion sensor detects a plurality of three-dimensional rotation matrices of the indicating device in a space, and the control unit transmits the three-dimensional rotation matrices to the electronic device via the wireless communication circuit, wherein each of the three-dimensional rotation matrices includes a plurality of angle variation values detected by the motion sensor on a plurality of axial directions in a time unit, wherein the space is a three-dimensional space, wherein the indicating device is operated in the three-dimensional space;
    wherein a movement trace of the indicating device is computed by the electronic device according to the three-dimensional rotation matrices, and a corresponding operating function is operated according to the movement trace, wherein the movement trace is a continuous two-dimensional movement path.

2. The electronic system according to claim 1, wherein the electronic device includes a processing circuit configured to compute a plurality of projection positions of the three-dimensional rotation matrices on a virtual reference plane, a two-dimensional movement path is formed on the virtual reference plane, and the movement trace includes the two-dimensional movement path.

3. The electronic system according to claim 2, wherein when the switch circuit is triggered, the control unit detects an initial axial direction of the indicating device via the motion sensor and transmits the initial axial direction to the electronic device via the wireless communication circuit, and the initial axial direction is a normal vector of the virtual reference plane.

4. The electronic system according to claim 1, wherein the electronic device includes a memory unit configured to store a signature trace, and the electronic device compares the movement trace with the signature trace in the memory unit for verification.

5. The electronic system according to claim 1, wherein the electronic device includes a broadcasting unit and a display unit, when the switch circuit is triggered, a volume adjustment menu is displayed on the display unit, and the electronic device adjusts the volume of the broadcasting unit according to the movement trace.

6. The electronic system according to claim 1, wherein the electronic device includes a display unit configured to display a file, when the switch circuit is triggered, a plurality of thumbnail pages of the file are displayed on the display unit, and the electronic device scrolls the thumbnail pages according to the movement trace.

7. An operating method, adapted to an indicating device including a switch circuit and a motion sensor, the operating method comprising:
    detecting whether the switch circuit is triggered;
    detecting a plurality of three-dimensional rotation matrices of the indicating device in a space by the motion sensor while the switch circuit is triggered, wherein each of the three-dimensional rotation matrices includes a plurality of angle variation values detected by the motion sensor on a plurality of axial directions in a time unit, wherein the space is a three-dimensional space, wherein the indicating device is operated in the three-dimensional space; and
    providing the three-dimensional rotation matrices for computing a movement trace of the indicating device, wherein the movement trace is a continuous two-dimensional movement path.

8. The operating method according to claim 7, wherein the step of computing the movement trace of the indicating device comprises:
    computing a plurality of projection positions of the three-dimensional rotation matrices on a virtual reference plane; and
    forming a two-dimensional movement path on the virtual reference plane and taking the two-dimensional movement path as the movement trace of the indicating device.

9. The operating method according to claim 8, wherein the step of computing the movement trace of the indicating device further comprises:
    detecting an initial axial direction of the indicating device when the switch circuit is triggered; and
    taking the initial axial direction as a normal vector to determine the virtual reference plane.

10. An indicating device, adapted to an electronic device, comprising:
    a wireless communication circuit configured to be communicated to the electronic device;
    a switch circuit;
    a motion sensor configured to detect a movement of the indicating device; and
    a control unit coupled to the wireless communication circuit, the motion sensor and the switch circuit, wherein while the switch circuit is triggered, the motion sensor detects a plurality of three-dimensional rotation matrices of the indicating device in a space, the control unit transmits the three-dimensional rotation matrices to the electronic device via the wireless communication circuit, wherein each of the three-dimensional rotation matrices includes a plurality of angle variation values detected by the motion sensor on a plurality of axial directions in a time unit, wherein the space is a three-dimensional space, wherein the indicating device is operated in the three-dimensional space;
    wherein a movement trace of the indicating device is computed by the electronic device according to the three-dimensional rotation matrices, and a corresponding operating function is operated according to the movement trace, wherein the movement trace is a continuous two-dimensional movement path.

* * * * *